(12) United States Patent
Zhao et al.

(10) Patent No.: US 11,343,504 B2
(45) Date of Patent: May 24, 2022

(54) APPARATUS AND METHOD FOR PICTURE CODING WITH SELECTIVE LOOP-FILTERING

(71) Applicant: Huawei Technologies Co., Ltd., Shenzhen (CN)

(72) Inventors: Zhijie Zhao, Munich (DE); Johannes Sauer, Aachen (DE); Mathias Wien, Aachen (DE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/004,979

(22) Filed: Aug. 27, 2020

(65) Prior Publication Data

US 2020/0396461 A1 Dec. 17, 2020

Related U.S. Application Data

(63) Continuation of application No. PCT/EP2018/055222, filed on Mar. 2, 2018.

(51) Int. Cl.
*H04N 19/132* (2014.01)
*H04N 19/105* (2014.01)
(Continued)

(52) U.S. Cl.
CPC ......... *H04N 19/132* (2014.11); *H04N 19/105* (2014.11); *H04N 19/117* (2014.11); *H04N 19/176* (2014.11)

(58) Field of Classification Search
CPC .. H04N 19/132; H04N 19/105; H04N 19/117; H04N 19/176; H04N 19/597; H04N 19/86
(Continued)

(56) References Cited

U.S. PATENT DOCUMENTS

2005/0013494 A1 1/2005 Srinivasan et al.
2010/0008513 A1 1/2010 Bailey et al.
(Continued)

FOREIGN PATENT DOCUMENTS

CN 103004196 A 3/2013
CN 106664403 A 5/2017
(Continued)

OTHER PUBLICATIONS

Lin et al., "AHG8: Compact cube layout with tile partition," Joint Video Exploration Team (JVET) of ITU-T SG 16 WP 3 and ISO/IEC JTC 1/SC 29/WG 11, Document: JVET-D0104, 4th Meeting: Chengdu, CN, XP030150347, pp. 1-6 (Oct. 15-21, 2016).
(Continued)

*Primary Examiner* — Susan E. Hodges
(74) *Attorney, Agent, or Firm* — Leydig, Voit & Mayer, Ltd.

(57) ABSTRACT

An apparatus, a method, and a computer program performs image coding with selective loop-filtering. That is, the loop-filters which operate on samples across discontinuous face boundaries are capable of being disabled. The loop-filter operation may be deferred until all samples across a face boundary are known. Then, the loop-filter can use the correct samples according to the 3D arrangement. This may be implemented on the coding block level or at a higher level.

14 Claims, 7 Drawing Sheets

(51) Int. Cl.
*H04N 19/117* (2014.01)
*H04N 19/176* (2014.01)

(58) Field of Classification Search
USPC .......................................................... 375/240
See application file for complete search history.

(56) References Cited

U.S. PATENT DOCUMENTS

| | | | |
|---|---|---|---|
| 2017/0280141 | A1 | 9/2017 | Chou et al. |
| 2017/0287107 | A1 | 10/2017 | Forutanpour et al. |
| 2017/0323423 | A1 | 11/2017 | Lin et al. |
| 2017/0366808 | A1 | 12/2017 | Lin et al. |
| 2018/0020202 | A1 | 1/2018 | Xu et al. |
| 2018/0192074 | A1* | 7/2018 | Shih ..................... H04N 19/597 |
| 2018/0343470 | A1* | 11/2018 | Schmit ................. H04N 19/593 |

FOREIGN PATENT DOCUMENTS

| | | |
|---|---|---|
| CN | 107409231 A | 11/2017 |
| CN | 107736023 A | 2/2018 |
| EP | 3301929 A1 | 4/2018 |
| WO | 2018001208 A1 | 1/2018 |
| WO | 2018059654 A1 | 4/2018 |

OTHER PUBLICATIONS

He et al., "AHG8: InterDigital's projection format conversion tool," Joint Video Exploration Team (JVET) of ITU-T SG 16 WP 3 and ISO/IEC JTC 1/SC 29/WG 11, Document: JVET-D0021, 4th Meeting: Chengdu, CN, XP030150244, pp. 1-17, URL: http://phenix.int-evry.fr/jvet/ (Oct. 15-21, 2016).

Chen et al., "Algorithm Description of Joint Exploration Test Model 7 (JEM 7)," Joint Video Exploration Team (JVET) of ITU-T SG 16 WP 3 and ISO/IEC JTC 1/SC 29/WG 11, Document: JVET-G1001-v1, 7th Meeting: Torino, IT, Total 50 pages (Jul. 13-21, 2017).

Zhou "AHG8: A study on compression efficiency of cube projection," Joint Video Exploration Team (JVET) of ITU-T SG 16 WP 3 and ISO/IEC JTC 1/SC 29/WG 11, Document: JVET-D0022, 4th Meeting: Chengdu, CN, pp. 1-7 (Oct. 15-21, 2016).

Wien "High Efficiency Video Coding—Coding Tools and Specification," Total 331 pages, Springer-Verlag Berlin Heidelberg (2015).

Jang et al., "Parallel deblocking filter for QTBT," Joint Video Exploration Team (JVET) of ITU-T SG 16 WP 3 and ISO/IEC JTC 1/SC 29/WG 11, Document: JVET-D0044, 4th Meeting: Chengdu, CN, pp. 1-4 (Oct. 15-21, 2016).

Norkin et al., "HEVC Deblocking Filter," IEEE Transactions on Circuits and Systems for Video Technology, vol. 22, No. 12, pp. 1746-1754, Institute of Electrical and Electronics Engineers, New York, New York (Dec. 2012).

Fu et al., "Sample Adaptive Offset in the HEVC Standard," IEEE Transactions on Circuits and Systems for Video Technology, vol. 22, No. 12, pp. 1755-1764, Institute of Electrical and Electronics Engineers, New York, New York (Dec. 2012).

"Series H: Audiovisual and Multimedia Systems, Infrastructure of audiovisual services—Coding of moving video. High efficiency video coding," Recommendation of ITU-T H.265, ITU-T Telecommunication Standardization Sector of ITU, pp. 1-692, International Telecommunication Union, Geneva, Switzerland (Feb. 2018).

"Series H: Audiovisual and Multimedia Systems, Infrastructure of audiovisual services—Coding of moving video. Advanced video coding for generic audiovisual services," Recommendation of ITU-T H.264, ITU-T Telecommunication Standardization Sector of ITU, pp. 1-812, International Telecommunication Union, Geneva, Switzerland (Apr. 2017).

* cited by examiner

```
            1

2   Top   3

4
        ┌───────┬───────┬───────┬───────┐
        │  4'   │  3'   │  1'   │  2'   │
        │       │       │       │       │
        │5 Front 6│6' Right 7│7' Back 8│8' Left 5'│
        │       │       │       │       │
        │  9    │  10   │  11   │  12   │
        └───────┴───────┴───────┴───────┘
            9'

12' Bottom 10'

APPARATUS AND METHOD FOR PICTURE CODING WITH SELECTIVE LOOP-FILTERING

CROSS-REFERENCE TO RELATED APPLICATIONS

This application is a continuation of International Application PCT/EP2018/055222, filed Mar. 2, 2018, the disclosure of which is hereby referenced in its entirety.

FIELD

The present disclosure relates to the field of picture coding. Particularly, the disclosure relates to improving coding and decoding of pictures with selective loop-filtering.

BACKGROUND 360-degree video or spherical video is a way of experiencing immersive video using devices such as head-mounted displays (HMD). This technique can provide an immersive "being there" experience for consumers by capturing a full panoramic view of the world. 360-degree video is typically recorded using a special rig of multiple cameras, or using a dedicated virtual reality (VR) camera that contains multiple embedded camera lenses. The resulting footage is then stitched to form a single video. This process may be done by the camera itself, or by using video editing software that can analyze common visuals to synchronize and link the different camera feeds together to represent the full viewing sphere surrounding the camera rig. Essentially, the camera or the camera system maps a 360-degree scene onto a sphere.

The stitched image (i.e. the image on the surface of the sphere) is then mapped (or unfolded) from spherical into a two-dimensional (2D) rectangular representation based on projection (such as an equirectangular projection), and then encoded using, e.g., standard video codecs, such as H.264/AVC (Advanced Video Coding) and HEVC/H.265 (High Efficiency Video Coding). At the viewing end, after decoding, the video is mapped onto a virtual sphere with the viewer located at the center of the virtual sphere. The viewer can navigate inside the virtual sphere to see a view of the 360-degree world as desired and thereby have an immersive experience.

As mentioned, for coding of 360-degree videos a projection of the content to a 2D representation is necessary. In addition to an equirectangular projection, possible projections include projection to faces of a cube, octahedron, or the like. This introduces discontinuities, e.g., at borders or boundaries of frames, and in some cases at borders or boundaries of faces (such as faces of a cube or the like). Thereby, the smoothness of content across such borders is typically not preserved during coding. When the (de)coded video is rendered to a viewport, artifacts commonly appear at the seams of the reconnected borders. These artifacts can disturb the viewing experience.

Loop-filters, such as a deblocking filter, are generally used in video coding in order to compensate for artifacts caused by hybrid video coding framework. However, in 360-degree content there are several problems that affect the performance of the loop-filters. For example, in 360-degree content, artifacts are not only caused by coding block boundaries but also by disconnected face boundaries. Furthermore, correct application of a loop-filter requires that the border along which it is applied is continuous in a three-dimensional (3D) sense. Yet, this is not necessarily true for 360-degree content. Instead, loop-filters may be applied across both continuous and discontinuous boundaries for 360-degree content. Applying loop-filters across discontinuous boundaries may cause artifacts.

The frames or faces which are coded may be extended with padding of samples at the borders. However, this unnecessarily increases the frame size and leads to more samples to be encoded as well as to samples which are encoded twice.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

The present disclosure provides improved picture coding and decoding with selective loop-filtering.

According to a first aspect of the present disclosure, a picture coding apparatus is provided. The picture coding apparatus is configured to reconstruct sample values of a coding block of a picture of a two-dimensional, 2D, representation of spherical video in accordance with a projection format. The 2D representation comprises a set of 2D faces interconnected via boundaries. One or more of the boundaries are discontinuous in a corresponding three-dimensional, 3D, representation of the spherical video in accordance with the projection format. The 2D faces comprise a first 2D face and a second 2D face adjoining each other in one of the discontinuous boundaries. The first 2D face comprises the coding block, and the coding block adjoins the second 2D face. The 2D faces further comprise a third 2D face adjoining the first 2D face in a boundary that is continuous in the corresponding 3D representation of the spherical video in accordance with the projection format. The picture coding apparatus is further configured to perform loop-filtering of the reconstructed sample values of the coding block based on sample values of a set of filter support samples, wherein the set of filter support samples comprises one or more samples that are part of the third 2D face. Artifacts can thus be avoided.

In a further implementation form of the first aspect, the picture coding apparatus is further configured to defer the performing of the loop-filtering for one or more of the reconstructed sample values of the coding block in response to one or more sample values of the samples in the set of filter support samples not being applicable for the loop-filtering yet, until said one or more sample values of the samples in the set of filter support samples become applicable for the loop-filtering. Artifacts can thus be avoided.

In a further implementation form of the first aspect, the picture coding apparatus is further configured to perform loop-filtering of one or more samples that are located at an outer picture boundary of the 2D representation.

In a further implementation form of the first aspect, the picture coding apparatus is further configured to maintain discontinuous boundary sample information indicating which samples are located at the one or more discontinuous boundaries.

In a further implementation form of the first aspect, the picture coding apparatus is further configured to maintain reconstruction state information indicating whether neighboring samples for loop-filtering of the samples indicated by the discontinuous boundary sample information have been reconstructed.

In a further implementation form of the first aspect, the loop-filtering comprises one or more different loop-filtering operations, and the picture coding apparatus is further configured to maintain at least one of the discontinuous boundary sample information or the reconstruction state information separately for each of the multiple different loop-filtering operations.

In a further implementation form of the first aspect, the loop-filtering comprises one or more different loop-filtering operations, and the picture coding apparatus is further configured to maintain at least one of the discontinuous boundary sample information or the reconstruction state information jointly for each of the multiple different loop-filtering operations.

In a further implementation form of the first aspect, the loop-filtering comprises at least one of an in-loop-bilateral filtering operation, a deblocking filtering operation, a sample adaptive offset filtering operation, or an adaptive loop-filtering operation.

In a further implementation form of the first aspect, one or more parameters of the loop-filtering of the reconstructed sample values of the coding block differ from corresponding parameters of loop-filtering of reconstructed sample values of one or more other blocks in the picture.

In a further implementation form of the first aspect, the projection format comprises a cube format, an icosahedron format, an equirectangular format, or a modification thereof.

In a further implementation form of the first aspect, the picture coding apparatus comprises a picture encoding apparatus.

In a further implementation form of the first aspect, the picture coding apparatus comprises a picture decoding apparatus.

According to a second aspect of the present disclosure, a method of picture coding is provided. The method comprises reconstructing (e.g., by a picture coding apparatus) sample values of a coding block of a picture of a two-dimensional, 2D, representation of spherical video in accordance with a projection format. The 2D representation comprises a set of 2D faces interconnected via boundaries. One or more of the boundaries are discontinuous in a corresponding three-dimensional, 3D, representation of the spherical video in accordance with the projection format. The 2D faces comprise a first 2D face and a second 2D face adjoining each other in one of the discontinuous boundaries. The first 2D face comprises the coding block, and the coding block adjoins the second 2D face. The 2D faces further comprise a third 2D face adjoining the first 2D face in a boundary that is continuous in the corresponding 3D representation of the spherical video in accordance with the projection format. The method further comprises performing (e.g., by the picture coding apparatus) loop-filtering of the reconstructed sample values of the coding block based on sample values of a set of filter support samples, wherein the set of filter support samples comprises one or more samples that are part of the third 2D face.

In a further implementation form of the second aspect, the method further comprises deferring, by the picture coding apparatus, the performing of the loop-filtering for one or more of the reconstructed sample values of the coding block in response to one or more sample values of the samples in the set of filter support samples not being applicable for the loop-filtering yet, until said one or more sample values of the samples in the set of filter support samples become applicable for the loop-filtering.

In a further implementation form of the second aspect, the method further comprises performing, by the picture coding apparatus, loop-filtering of one or more samples that are located at an outer picture boundary of the 2D representation.

In a further implementation form of the second aspect, the method further comprises maintaining, by the picture coding apparatus, discontinuous boundary sample information indicating which samples are located at the one or more discontinuous boundaries.

In a further implementation form of the second aspect, the method further comprises maintaining, by the picture coding apparatus, reconstruction state information indicating whether neighboring samples for loop-filtering of the samples indicated by the discontinuous boundary sample information have been reconstructed.

In a further implementation form of the second aspect, the loop-filtering comprises one or more different loop-filtering operations, and the method further comprises maintaining, by the picture coding apparatus, at least one of the discontinuous boundary sample information or the reconstruction state information separately for each of the multiple different loop-filtering operations.

In a further implementation form of the second aspect, the loop-filtering comprises one or more different loop-filtering operations, and the method further comprises maintaining, by the picture coding apparatus, at least one of the discontinuous boundary sample information or the reconstruction state information jointly for each of the multiple different loop-filtering operations.

In a further implementation form of the second aspect, the loop-filtering comprises at least one of an in-loop-bilateral filtering operation, a deblocking filtering operation, a sample adaptive offset filtering operation, or an adaptive loop-filtering operation.

In a further implementation form of the second aspect, one or more parameters of the loop-filtering of the reconstructed sample values of the coding block differ from corresponding parameters of loop-filtering of reconstructed sample values of one or more other blocks in the picture.

In a further implementation form of the second aspect, the projection format comprises a cube format, an icosahedron format, an equirectangular format, or a modification thereof.

In a further implementation form of the second aspect, the picture coding apparatus comprises a picture encoding apparatus.

In a further implementation form of the second aspect, the picture coding apparatus comprises a picture decoding apparatus.

According to a third aspect of the present disclosure, a computer program is provided. The computer program comprises program code configured to perform the method according to the second aspect, when the computer program is executed on a computing device.

According to a fourth aspect of the present disclosure, an arrangement for cube projection for a two-dimensional, 2D, representation of spherical video is provided. The 2D representation comprises a set of 2D cube faces interconnected via boundaries. One or more of the boundaries are discontinuous in a corresponding three-dimensional, 3D, representation of the spherical video. Only one boundary of each 2D cube face or its opposing boundary in the 3D representation is aligned with a boundary for which loop-filtering is to be performed by a picture coding apparatus in accordance with the first aspect.

Many of the attendant features will be further appreciated with reference to the following detailed description considered in connection with the accompanying drawings.

BRIEF DESCRIPTION OF THE DRAWINGS

In the following, example embodiments of the present disclosure are described with reference to the attached figures and drawings, in which:

FIG. 5 is a diagram illustrating an example of a 2D representation of spherical video, in accordance with a cube projection format;

Figure 1:
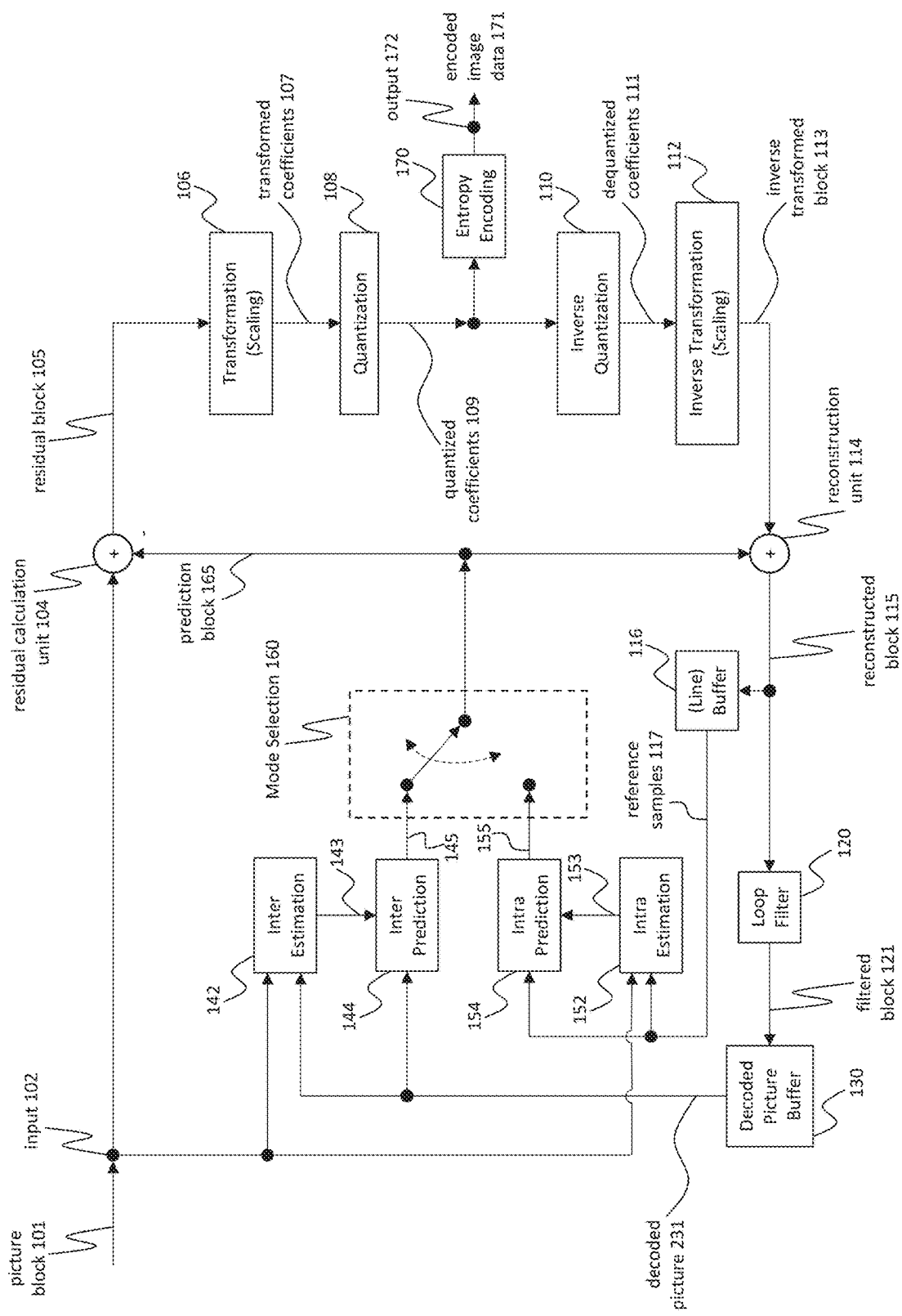
FIG. 1 is a block diagram showing an example embodiment of a video encoding apparatus.

In the following, identical reference signs refer to identical or at least functionally equivalent features.

DETAILED DESCRIPTION

In the following description, reference is made to the accompanying drawings, which form part of the disclosure, and in which are shown, by way of illustration, example aspects in which the present disclosure may be placed. It is understood that other aspects may be utilized and structural or logical changes may be made without departing from the scope of the present disclosure. The following detailed description, therefore, is not to be taken in a limiting sense.

For instance, it is understood that a disclosure in connection with a described method may also hold true for a corresponding device or system configured to perform the method and vice versa. For example, if a specific method step is described, a corresponding device may include a unit to perform the described method step, even if such unit is not explicitly described or illustrated in the figures. On the other hand, for example, if a specific apparatus is described based on functional units, a corresponding method may include a step performing the described functionality, even if such step is not explicitly described or illustrated in the figures. Further, it is understood that the features of the various example aspects described herein may be combined with each other, unless specifically noted otherwise.

Video coding refers to the digital compression or decompression of a sequence of pictures, which form the video or video sequence. Instead of the term picture, the terms image or frame may be used synonymously in the field of video coding. Each picture is typically partitioned into a set of non-overlapping blocks. The encoding/coding of the video is typically performed on a block level where, e.g., inter frame prediction or intra frame prediction are used to generate a prediction block, to subtract the prediction block from the current block (block currently processed/to be processed) to obtain a residual block, which is further transformed and quantized to reduce the amount of data to be transmitted (compression), whereas at the decoder side the inverse processing is applied to the encoded/compressed block to reconstruct the block (video block) for representation.

The disclosed concepts provide disabling or deactivating loop-filters that operate on samples across discontinuous face boundaries. This has the advantage of avoiding artifacts created by loop-filter operations across discontinuous face boundaries. The disclosed concepts further provide deferring the loop-filter operation until all samples across a face boundary are reconstructed. Then, the loop-filter can use appropriate samples according to the 3D arrangement. This may be implemented on the coding block level or at a higher level. This has the advantage of allowing face boundaries to be correctly loop-filtered, such as deblocked or adaptive loop-filtered, with no additional samples having to be coded for padding.

As discussed above, the scene is captured in all directions around a single view point for 360-degree sequences. This can be achieved using multiple cameras arranged close to each other and with different view directions. The captured content is then stitched and can be thought of as a sphere around the view point with texture on it which represents the 360-degree scene. However, current display and video codecs require a flat (2D) rectangular image of a scene. Thus the sphere has to be converted to such a 2D format. There a several ways to do this, including but not limited to:

a) an equirectangular format that involves a projection to a rectangle similar to, e.g., the one that is used to create world maps from the globe of the earth. Here, distortion depends on position.

b) a cube format that involves mapping the sphere to the faces of a cube. Each face looks like a usual 2D image, with no visible geometrical distortions. However, there are geometrical distortions at the border of two faces.

c) an icosahedron format that involves mapping the sphere to the faces of an icosahedron. There are geometrical distortions at the border of two faces, though not as strong as for the cube format, since the angle between neighboring faces is lower.

Figure 4A:
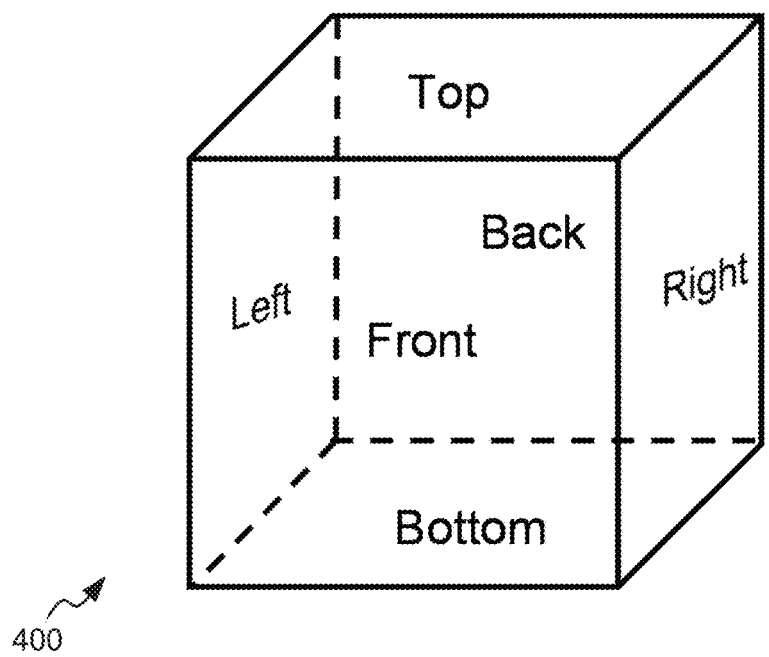
FIG. 4A is a diagram illustrating an example of a cube projection format.
Figure 4B:
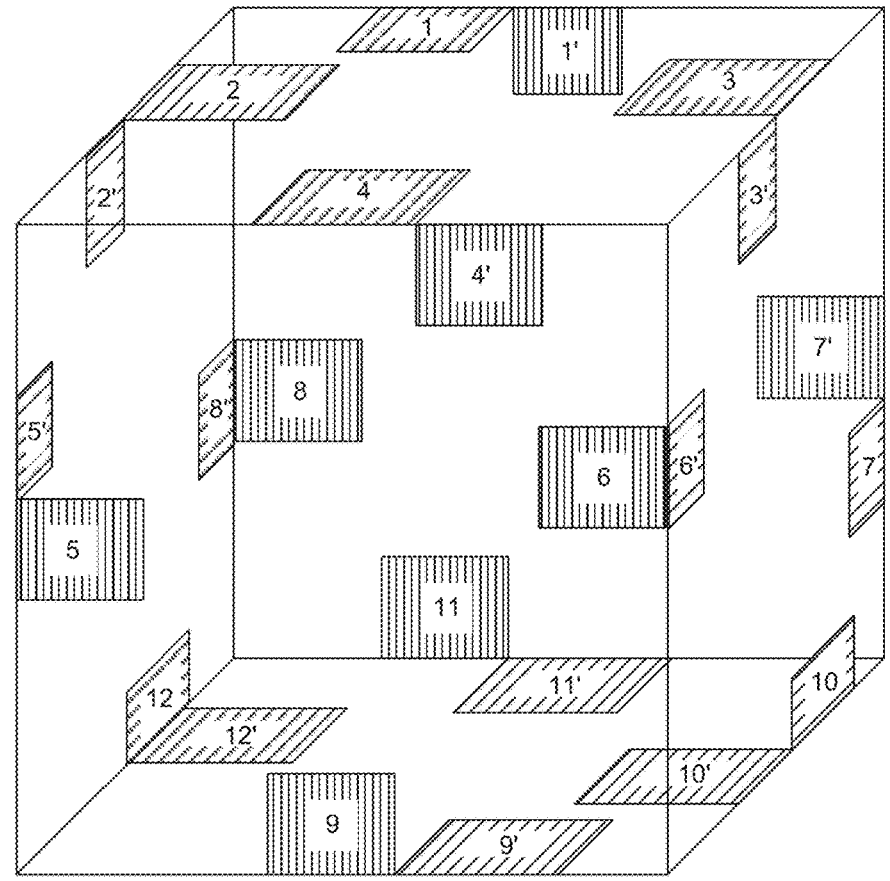
FIG. 4B is another diagram further illustrating an example of the cube projection format.
Figure 6A:
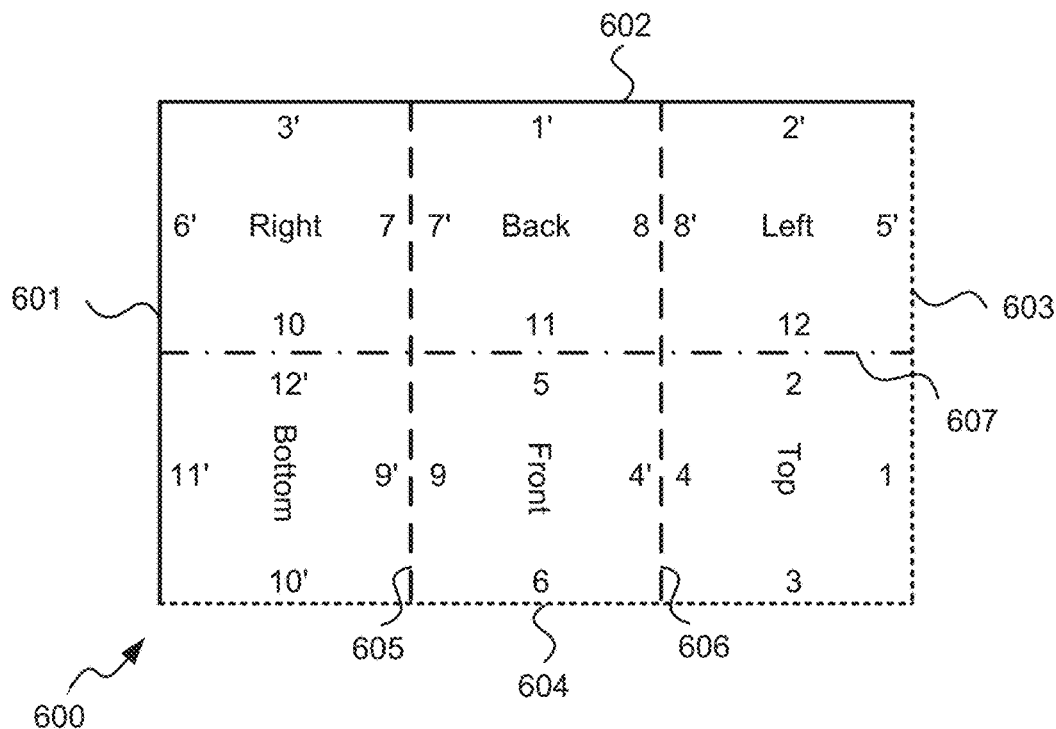
FIG. 6A is a diagram illustrating another example of a 2D representation of spherical video, in accordance with a cube projection format.
Figure 6B:
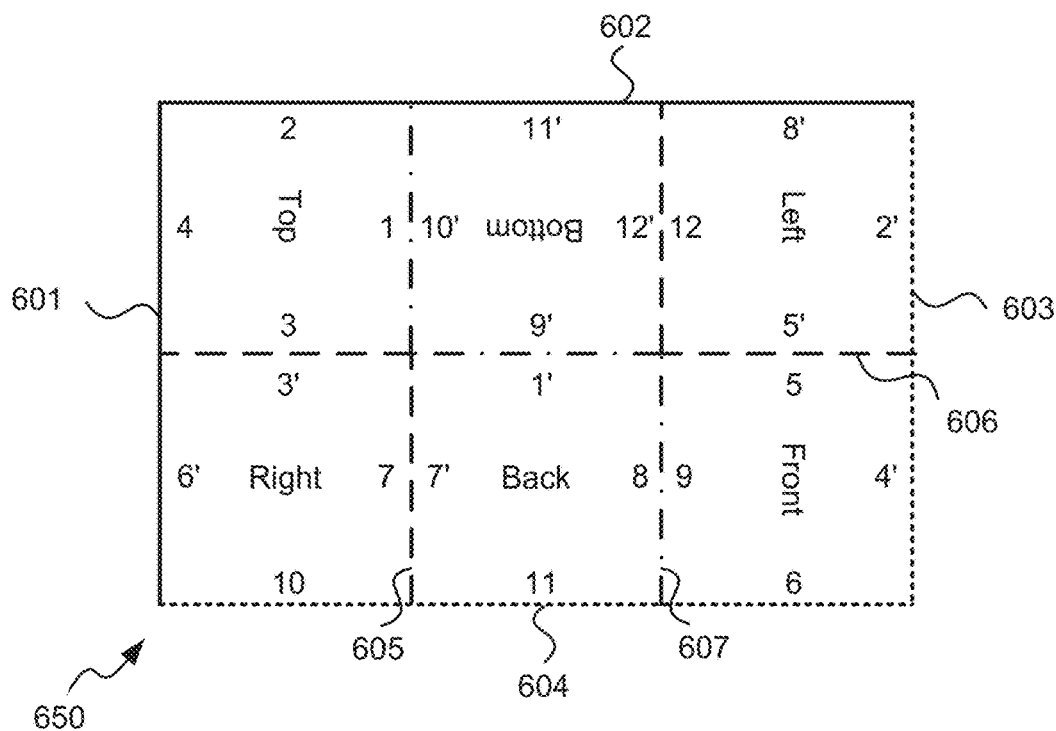
FIG. 6B is a diagram illustrating yet another example of a 2D representation of spherical video, in accordance with a cube projection format.

In the following, the cube format will be used as an example when discussing the disclosed concepts. FIGS. 4A and 4B illustrate an example 400 of the cube projection format. FIGS. 5, 6A and 6B illustrate examples 500, 600 and 650 of 2D representations of spherical video, in accordance with the cube projection format 400. In these examples, the faces comprise front, back, left, right, bottom and top faces. Furthermore, in these examples, face boundaries or edges are marked with consecutive numbers 1 to 12 and further with consecutive numbers 1' to 12', such that a pair of boundaries having a boundary with a given number and another boundary with the same number and an apostrophe constitute adjoining or counterpart boundaries in the 3D cube projection format. For example, boundaries 6 and 6' constitute adjoining boundaries in the 3D cube projection format, as shown in FIG. 4B. Similarly, boundaries 5 and 5' constitute adjoining boundaries in the 3D cube projection format, etc. Herein, the terms boundary and edge are used interchangeably.

When 360-degree content is mapped to a 2D representation, discontinuities are introduced into the content that do not exist on the sphere. FIG. 5 illustrates an example of a non-compact cube layout or 2D representation in which the connectivity of the cube faces is preserved as much as possible. The cube is unfolded such that all sides are still connected in 2D as they are connected in 3D. However, there are two unused regions in this format, the one on the top right (surrounded by 3, 3', 1' and 2') and the region on the bottom left (surrounded by 10, 10', 11, 12). Because of this, compact cube formats may be more suitable for use, examples of which are shown in FIGS. 6A and 6B.

FIGS. 6A and 6B illustrate different boundary types in compact cube formats and how they may be processed during loop-filtering. Continuous boundaries (dashed lines 605, 606) are those between faces that are connected to each other in both the 3D cube projection format and its 2D representation. Discontinuous boundaries (dot-and-dash lines 607) are those between faces that are not connected to each other in the 3D cube projection format but are connected to each other in its 2D representation.

In the examples of FIGS. 6A and 6B, at least some of the face boundaries (dotted lines 603, 604) aligned with the frame borders may not be loop-filtered. Further in the examples of FIGS. 6A and 6B, at least some others of the face boundaries (lines 601, 602) aligned with the frame borders may be loop-filtered.

Accordingly, in the example of FIG. 6A, face boundaries 4 and 4', 7 and 7', 8 and 8', 9 and 9' are continuous, whereas face boundaries 10 and 12', 11 and 5, 12 and 2 are discontinuous boundaries. In the example of FIG. 6B, face boundaries 3 and 3', 7 and 7', 5 and 5', 12 and 12' are continuous, whereas face boundaries 1 and 10', 9' and 1', 8 and 9 are discontinuous boundaries.

Applying loop-filters across discontinuous boundaries can result in artifacts. Yet, for optimal behavior of a coder, all face boundaries should be loop-filtered.

The disclosed concepts may have at least some of the following set of features:

A loop-filter may be disabled for a coding block if the loop filter operates on samples across a discontinuous face boundary. The loop-filtering may be deferred until all such connected neighboring blocks of a coding block that are required for the correct application of the particular loop-filter are available or reconstructed.

All boundary samples can be loop-filtered, such as deblocked or adaptive loop-filtered, because all the samples are available after complete reconstruction of the decoded frame prior to loop-filtering.

The operations in accordance with the disclosed concepts can be performed on a coding block basis with the option to release finally processed blocks from memory if not further needed for other purposes.

When applied in HEVC/JEM (Joint Exploration Model), the disclosed concepts may affect samples at boundaries where the deblocking filter (DBF) is applied, including coding tree block (CTB), coding block (CB), prediction block (PB) and transform block (TB) boundaries when they are co-located with face boundaries. Furthermore, the disclosed concepts may affect the operation of sample-adaptive offset (SAO) for boundary samples. Furthermore, the disclosed concepts may affect the operation of adaptive loop-filtering (ALF) or bilateral filter when the ALF or bilateral filter is used across a face boundary.

In the following, example embodiments of an encoder 100 and a decoder 200 are described based on FIGS. 1 and 2.

FIG. 1 shows an encoder 100, which comprises an input 102, a residual calculation unit 104, a transformation unit 106, a quantization unit 108, an inverse quantization unit 110, and inverse transformation unit 112, a reconstruction unit 114, a loop-filter 120, a frame buffer 130, an inter estimation unit 142, an inter prediction unit 144, an intra estimation unit 152, an intra prediction unit 154, a mode selection unit 160, an entropy encoding unit 170, and an output 172.

The input 102 is configured to receive a picture block 101 of a picture (e.g., a still picture or picture of a sequence of pictures forming a video or video sequence). The picture block may also be referred to as a current picture block or a picture block to be coded, and the picture as a current picture or a picture to be coded.

The residual calculation unit 104 is configured to calculate a residual block 105 based on the picture block 101 and a prediction block 165 (further details about the prediction block 165 are provided later), e.g., by subtracting sample values of the prediction block 165 from sample values of the picture block 101, sample by sample (pixel by pixel) to obtain a residual block in the sample domain.

The transformation unit 106 is configured to apply a transformation, e.g., a discrete cosine transform (DCT) or discrete sine transform (DST), on the residual block 105 to obtain transformed coefficients 107 in a transform domain. The transformed coefficients 107 may also be referred to as transformed residual coefficients and represent the residual block 105 in the transform domain.

The quantization unit 108 is configured to quantize the transformed coefficients 107 to obtain quantized coefficients 109, e.g., by applying scalar quantization or vector quantization. The quantized coefficients 109 may also be referred to as quantized residual coefficients 109.

The inverse quantization unit 110 is configured to apply the inverse quantization of the quantization unit 108 on the quantized coefficients to obtain or regain dequantized coefficients 111. The dequantized coefficients 111 may also be referred to as dequantized residual coefficients 111.

The inverse transformation unit 112 is configured to apply the inverse transformation of the transformation applied by the transformation unit 106, e.g., an inverse discrete cosine transform (DCT) or inverse discrete sine transform (DST), to obtain an inverse transformed block 113 in the sample domain. The inverse transformed block 113 may also be referred to as inverse transformed dequantized block 113 or inverse transformed residual block 113.

The reconstruction unit 114 is configured to combine the inverse transformed block 113 and the prediction block 165 to obtain a reconstructed block 115 in the sample domain, e.g., by sample-wise adding the sample values of the decoded residual block 113 and the sample values of the prediction block 165.

The buffer unit 116 (or short "buffer" 116), e.g., a line buffer 116, is configured to buffer or store the reconstructed block, e.g., for intra estimation and/or intra prediction.

The loop-filter unit 120 (or short "loop-filter" 120), is configured to filter the reconstructed block 115 to obtain a filtered block 121, e.g., by applying a bilateral filter, a de-blocking filter, a sample-adaptive offset (SAO) filter, an adaptive loop-filter, or other filters. The filtered block 121 may also be referred to as filtered reconstructed block 121. Various loop-filters are described in more detail, e.g., in Joint Video Exploration Team (JVET) standards related documentation, such as JVET-G1001 which discloses an algorithm description of Joint Exploration Test Model 7 (JEM7).

The loop-filter unit 120 may comprise a filter analysis unit and the actual filter unit, wherein the filter analysis unit is configured to determine loop-filter parameters for the actual filter unit.

The loop-filter unit 120 may comprise one or a plurality of filters, e.g., one or more of different kinds or types of filters, e.g., connected in series or in parallel or in any combination thereof, wherein each of the filters may comprise individually or jointly with other filters of the plurality of filters a filter analysis unit to determine the respective loop-filter parameters.

The loop-filter unit 120 may be configured to provide the loop-filter parameters to the entropy encoding unit 170, e.g., for entropy encoding and transmission.

Because a frame may be processed as independent processing or coding blocks in some parts of the encoding and/or decoding procedure, visible artifacts, such as discontinuities, may be introduced to the reconstructed frame. Due to these artifacts, for example, boundaries of the coding blocks may be visible in the reconstructed frame. Loop-filtering may be used to mitigate or remove these artifacts and other artifacts caused by the encoding/decoding procedure from the reconstructed frame. For example, a deblocking filter may be used to apply adaptive smoothing across boundaries of processing blocks, such as prediction and transform blocks. SAO filtering may be applied, for example, after deblocking filtering. SAO may be used in a so called boundary offset mode, where local directional structures in the reconstructed frame are filtered, or in a so called band offset mode, where the intensity of samples is modified based on the intensity of the sample.

The decoded picture buffer 130 is configured to receive and store the filtered block 121 and other previous filtered blocks, e.g., previously reconstructed and filtered blocks 121, of the same current picture or of different pictures, e.g., previously reconstructed pictures, e.g., for inter estimation and/or inter prediction.

The inter estimation unit 142, also referred to as inter picture estimation unit 142, is configured to receive the picture block 101 (current picture block of a current picture) and one or a plurality of previously reconstructed blocks, e.g., reconstructed blocks of one or a plurality of other/different previously decoded pictures 231, for inter estimation (or "inter picture estimation"). For example, a video sequence may comprise the current picture and the previously decoded pictures 231. The current picture and the previously decoded pictures 231 may be part of or form a sequence of pictures forming a video sequence.

The encoder 100 may, e.g., be configured to obtain a reference block from a plurality of reference blocks of the same or different pictures of the plurality of other pictures and provide a reference picture (or e.g., a reference picture index) and/or an offset (spatial offset) between the position (x, y coordinates) of the reference block and the position of the current block as inter estimation parameters 143 to the inter prediction unit 144. This offset is also called motion vector (MV). The inter estimation is also referred to as motion estimation (ME) and the inter prediction also motion prediction (MP).

The inter prediction unit 144 is configured to receive an inter prediction parameter 143 and to perform inter estimation based on/using the inter prediction parameter 143 to obtain an inter prediction block 145.

The intra estimation unit 152 is configured to receive the picture block 101 (current picture block) and one or a plurality of previously reconstructed blocks, e.g., reconstructed neighbor blocks, of the same picture for intra estimation. The encoder 100 may, e.g., be configured to obtain an intra prediction mode from a plurality of intra prediction modes and provide it as intra estimation parameter 153 to the intra prediction unit 154.

The encoder 100 may be configured to select the intra-prediction mode based on an optimization criterion, e.g., minimum residual (e.g., the intra-prediction mode providing the prediction block 155 most similar to the current picture block 101) or minimum rate distortion.

The intra prediction unit 154 is configured to determine based on the intra prediction parameter 153, e.g., the selected intra prediction mode 153, the intra prediction block 155.

Mode selection unit 160 may be configured to perform inter estimation/prediction and intra estimation/prediction, or control the inter estimation/prediction and intra estimation/prediction, and to select a reference block and/or prediction mode (intra or inter prediction mode) to be used as prediction block 165 for the calculation of the residual block 105 and for the reconstruction of the reconstructed block 115.

The mode selection unit 160 may be configured to select the prediction mode, which provides the minimum residual (minimum residual means better compression), or a minimum signaling overhead, or both. The mode selection unit 160 may be configured to determine the prediction mode based on rate distortion optimization (RDO).

The entropy encoding unit 170 is configured to apply an entropy encoding algorithm on the quantized residual coefficients 109, inter prediction parameters 143, intra prediction parameter 153, and/or loop-filter parameters, individually or jointly (or not at all) to obtain encoded picture data 171 which can be output by the output 172, e.g., in the form of an encoded bit stream 171.

The encoder 100 may be configured such that, e.g., the buffer unit 116 is not only used for storing the reconstructed blocks 115 for intra estimation 152 and/or intra prediction 154 but also for the loop-filter unit 120, and/or such that, e.g., the buffer unit 116 and the decoded picture buffer unit 130 form one buffer. Further embodiments may be configured to use filtered blocks 121 and/or blocks or samples from the decoded picture buffer 130 as input or basis for intra estimation 152 and/or intra prediction 154.

The encoder 100 may comprise a picture partitioning unit to partition a picture into a set of typically non-overlapping blocks before processing the picture further. Accordingly, the encoder 100 may comprise an input 102 configured to receive blocks (video blocks) of pictures of a video sequence (video stream). Pictures may comprise M×N samples (horizontal dimension×vertical dimension) and the blocks may comprise m×n samples (horizontal dimension×vertical dimension), and the picture may have a square dimension of m×n samples.

A "sample" is a small segment of a picture and has a sample value associated with it. The sample value is a measure of an intensity and/or color of the sample. A picture can be represented as a 2D array of samples. Samples are sometimes referred to in the art as pixels, but sometimes the word "pixel" refers to a small segment of a picture rendering device, e.g., a liquid-crystal display (LCD). The sample value may, for example, be the intensity value of a single color such as blue, green, or red, or it may be a multidimensional intensity, comprising a tuple of intensity values, e.g., comprising blue, green, and red intensity values.

The encoder 100 may be adapted to use the same block size for all pictures of a video sequence or to change the block size and the corresponding grid defining the block size and partitioning the picture into the corresponding blocks per picture or a subset of pictures.

For partitioning the pictures into blocks, the encoder 100 may comprise a picture partitioning unit (not depicted in FIG. 1).

Figure 2:
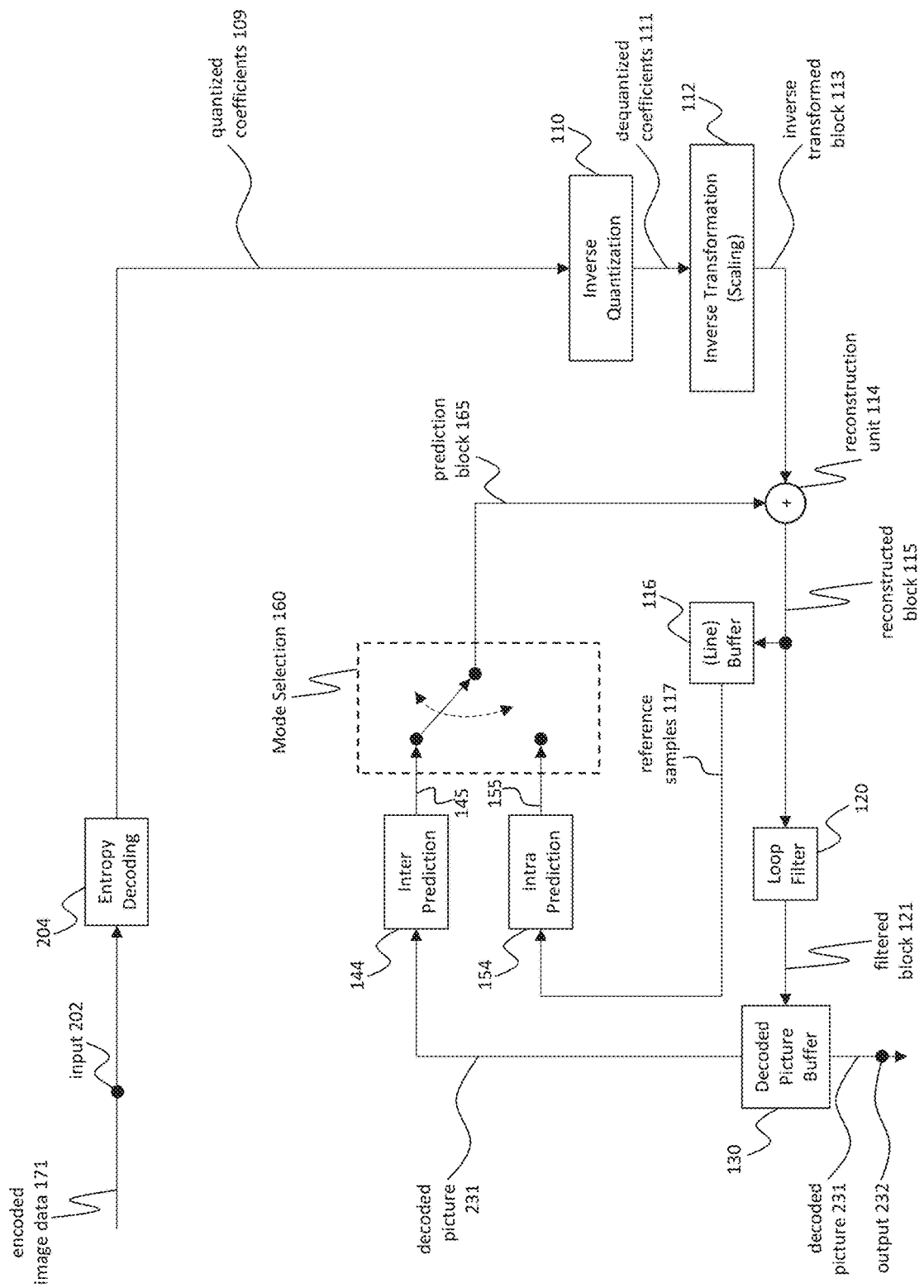
FIG. 2 is a block diagram showing an example embodiment of a video decoding apparatus.

FIG. 2 shows an example video decoder 200 configured to receive an encoded picture data (bit stream) 171, e.g., encoded by encoder 100, to obtain a decoded picture 231.

The decoder 200 comprises an input 202, an entropy decoding unit 204, an inverse quantization unit 110, an inverse transformation unit 112, a reconstruction unit 114, a buffer 116, a loop-filter 120, a decoded picture buffer 130, an inter prediction unit 144, an intra prediction unit 154, a mode selection unit 160 and an output 232. Here, identical reference signs refer to identical or at least functionally equivalent features between the video encoder 100 of FIG. 1 and the video decoder 200 of FIG. 2.

Accordingly, FIG. 1 and FIG. 2 illustrate examples of picture coding apparatuses. The picture coding apparatus may be a picture encoding apparatus, such as the video encoder 100 of FIG. 1, or the picture coding apparatus may be a picture decoding apparatus, such as the video decoder 200 of FIG. 2.

The picture coding apparatus 100 or 200 is configured to reconstruct sample values of a coding block of a picture of a 2D representation of spherical video in accordance with a projection format. The projection format may comprise e.g., a cube format, an icosahedron format, an equirectangular format, or a modification thereof. The coding block refers to a block of samples which are jointly processed and for which loop-filter operations may be applied. Examples of a coding block include a coding block (CB), prediction block (PB) and transform block (TB) in accordance with HEVC, as well as coding blocks in accordance with other suitable standards.

The 2D representation comprises a set of 2D faces interconnected via boundaries. One or more of the boundaries are discontinuous in a corresponding 3D representation of the spherical video in accordance with the projection format. Furthermore, one or more of the boundaries are continuous in the corresponding 3D representation of the spherical video in accordance with the projection format. Continuous and discontinuous boundaries were described above in connection with FIGS. 6A and 6B.

The 2D faces comprise a first 2D face and a second 2D face adjoining each other in one of the discontinuous boundaries. The first 2D face comprises the coding block, and the coding block adjoins the second 2D face. The 2D faces further comprises a third 2D face adjoining the first 2D face in one of the continuous boundaries.

The picture coding apparatus 100 or 200 is further configured to perform loop-filtering of the reconstructed sample values of the coding block based on sample values of a set of filter support samples, wherein the set of filter support samples comprises one or more samples that are part of the third 2D face. In an embodiment, the filter support samples do not include any samples of the second face. The loop-filtering may comprise e.g., an in-loop-bilateral filtering operation, a deblocking filtering operation, a sample adaptive offset filtering operation, and/or an adaptive loop-filtering operation.

In an embodiment, samples (such as filter support samples) may be obtained from connected or adjoining faces on the sphere for a current coding block e.g., as follows:

Option 1: by copying the samples from the third 2D face directly and by using these samples for performing the loop-filtering if they are available or reconstructed, or Option 2: by using geometric information to project the samples (if available or reconstructed) of the third 2D face to the 3D sphere, by mapping the projected samples in the 3D sphere to a projection format based on the geometric information and a selected interpolation filter, and then by using the mapped samples in the projection format as the filter support samples for performing the loop-filtering.

The picture coding apparatus 100 or 200 may be configured to perform the loop-filtering for one or more of the reconstructed sample values of the coding block when all sample values of the set of filter support samples have been reconstructed. For example, the picture coding apparatus 100 or 200 may configured to defer or delay the performing of the loop-filtering for one or more of the reconstructed sample values of the coding block in response to one or more sample values of the samples in the set of filter support samples not being applicable for the loop-filtering yet, until said one or more sample values of the samples in the set of filter support samples become applicable for the loop-filtering. The samples in the set of filter support samples not being applicable may be due to e.g., the samples not being reconstructed yet.

The picture coding apparatus 100 or 200 may be further configured to perform loop-filtering of one or more samples that are located at an outer picture boundary of the 2D representation. In an example, such outer picture boundaries include boundaries 601, 602 of FIGS. 6A and 6B aligned with top and left frame borders. The outer picture boundary may include e.g., the top picture boundary and/or the left picture boundary.

The picture coding apparatus 100 or 200 may be further configured to maintain discontinuous boundary sample information that indicates which samples are located at the one or more discontinuous boundaries. Additionally/alternatively, the picture coding apparatus 100 or 200 may be configured to maintain reconstruction state information that indicates whether neighboring samples for loop-filtering of the samples indicated by the discontinuous boundary sample information have been reconstructed.

Maintaining the reconstruction state information may be implemented e.g., in one of two ways:

1. On the fly: knowledge of the face arrangement is used along with the processing order of the block (i.e are there slice/tiles). Then it can be derived whether the connected neighboring block(s) has/have been decoded and thus is/are available, or
2. Storing a flag for the block at face boundaries. This may be done at the coding block level. After a block is reconstructed, the flag may be set to true. Loop-filtering can be performed when the flags for all connected neighboring block(s) is/are set to true.

In case the loop-filtering comprises multiple different loop-filtering operations, the picture coding apparatus 100 or 200 may be further configured to maintain the discontinuous boundary sample information and/or the reconstruction state information separately for at least some of the multiple different loop-filtering operations. Additionally/alternatively, the picture coding apparatus 100 or 200 may be configured to maintain the discontinuous boundary sample information and/or the reconstruction state information jointly for at least some of the multiple different loop-filtering operations.

In an embodiment, one or more parameters of the loop-filtering of the reconstructed sample values of the coding block may differ from corresponding parameters of loop-filtering of reconstructed sample values of one or more other blocks in the picture. For example, a boundary strength (bs) parameter derivation may be modified. For example, assuming that face boundaries need deblocking as strong as intra blocks, bs may be set to 2 for blocks at face boundaries. This may also ensure that chroma deblocking is applied as well.

Figure 3A:
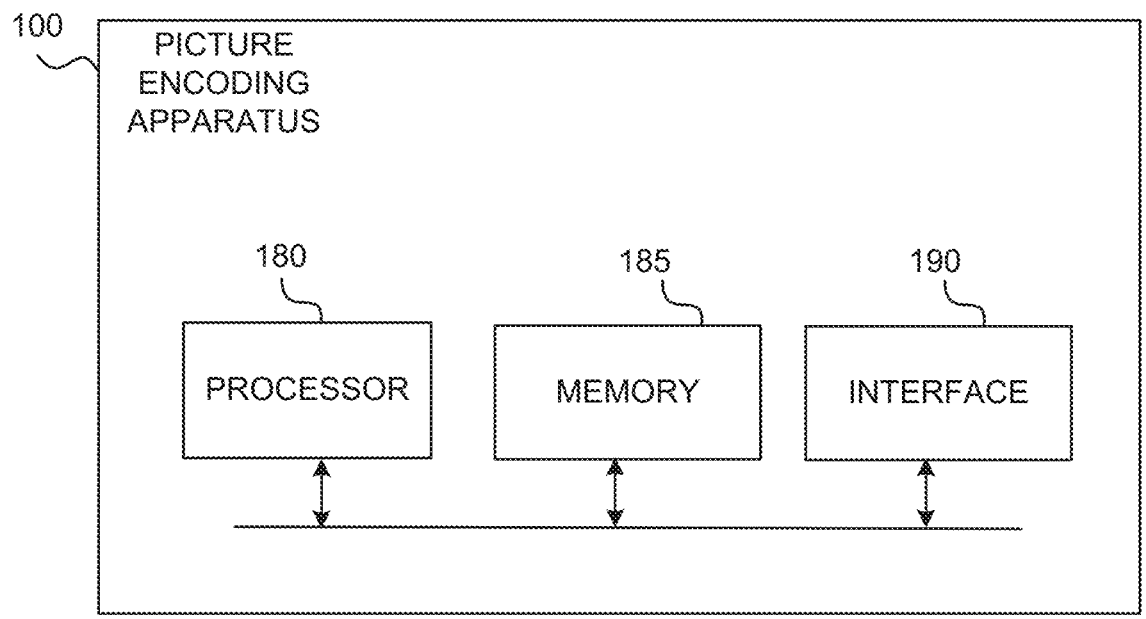
FIG. 3A is another block diagram showing another example embodiment of a video encoding apparatus.

FIG. 3A illustrates a further example of the picture encoding apparatus 100 of FIG. 1. The picture encoding apparatus 100 may comprise a processor 180, a memory 185 and/or an input/output interface 190. The processor 180 may be adapted to perform the functions of one or more of the residual calculation unit 104, transformation unit 106, quantization unit 108, inverse quantization unit 110, inverse transformation unit 112, reconstruction unit 114, loop-filter 120, inter estimation unit 142, inter prediction unit 144, intra estimation unit 152, intra prediction unit 154, mode selection unit 160, or entropy encoding unit 170. The input/output interface 190 may be adapted to perform the functions of one or more of the input 102 or output 172. The memory 185 may be adapted to perform the functions of one or more of the buffer 116 or the frame buffer 130.

Figure 3B:
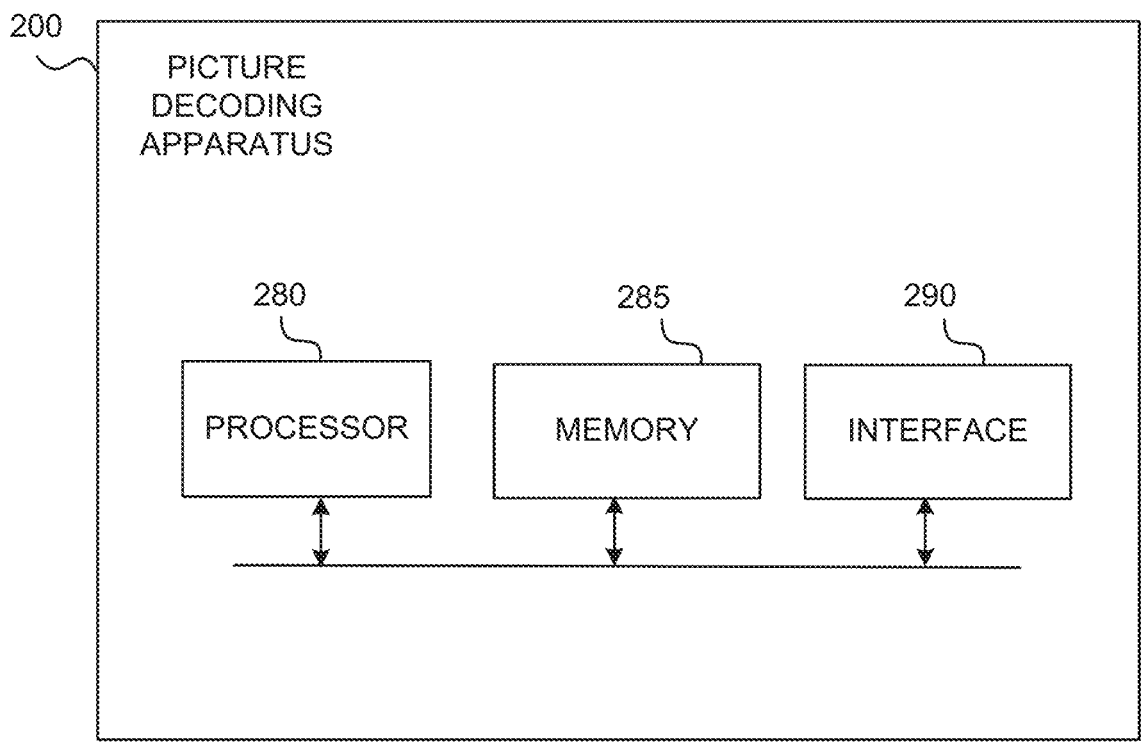
FIG. 3B is another block diagram showing another example embodiment of a video decoding apparatus.

FIG. 3B illustrates a further example of the picture decoding apparatus 200 of FIG. 2. The picture decoding apparatus 200 may comprise a processor 280, a memory 285 and/or an input/output interface 290. The processor 2180 may be adapted to perform the functions of one or more of the entropy decoding unit 204, inverse quantization unit 110, inverse transformation unit 112, reconstruction unit 114, loop-filter 120, inter prediction unit 144, intra prediction unit 154, or mode selection unit 160. The input/output interface 290 may be adapted to perform the functions of one or more of the input 202 or output 232. The memory 285 may be adapted to perform the functions of one or more of the buffer 116 or decoded picture buffer 130.

Figure 7:
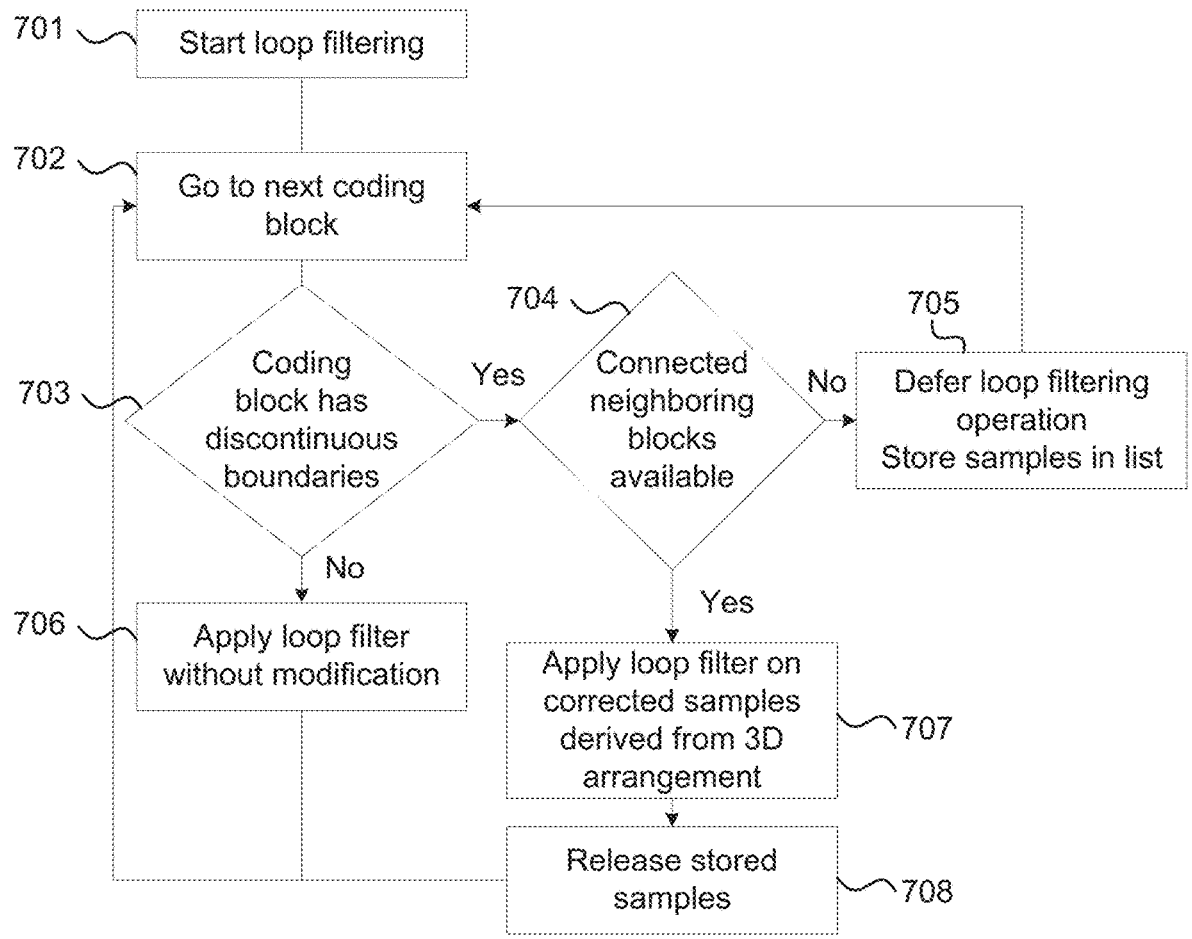
FIG. 7 is a flow diagram of an example method involving picture coding with selective loop-filtering.

FIG. 7 shows a flow diagram of an example method 700 involving coding and decoding of pictures with selective loop-filtering.

The method 700 starts at operation 701 and proceeds to operation 702 in which processing of a current coding block launches.

At operation 703, the method determines whether the current coding block comprises discontinuous or disconnected boundaries or edges. For example, boundary samples of discontinuous boundaries may be marked as not to be loop-filtered, and not to be used in loop-filtering operations of neighboring samples. These samples may be collected e.g., in a list of face boundary samples.

If the current coding block does not comprise discontinuous boundaries, the method proceeds to operation 706 in which loop-filtering is applied without the modifications of the disclosed concepts.

If the current coding block comprises discontinuous boundaries, the method proceeds to operation 704 in which the method determines whether connected neighboring blocks are available or reconstructed. If yes, the method proceeds to operation 707 in which the loop-filtering is applied with the modifications of the disclosed concepts, as described above. If not, the method proceeds to operation 705 in which the loop-filtering is deferred until connected neighboring blocks are available or reconstructed.

When applying an existing loop-filter, the loop-filter operation is skipped for samples in the above list of face boundary samples. The loop-filter operation is applied after complete availability of reconstruction for the relevant connected neighboring blocks. The relevant blocks are those which contain samples in the above list of face boundary samples. This loop-filter operation may access and modify samples which are not connected in the 2D representation but are connected in the 3D representation once these samples are reconstructed and available. If there are samples in the above list of face boundary samples which have been used for loop-filtering and are no longer needed for other purposes, they may be released from the memory, operation 708. As discussed above, different instances of the method 700 and the above list of face boundary samples may be used for different loop-filters. E.g., the list for deblocking filtering and the list for SAO in a scheme like HEVC may be separate.

The method comprises reconstructing sample values of the coding block of the picture of the 2D representation of spherical video in accordance with the projection format. The 2D representation comprises a set of 2D faces interconnected via boundaries. One or more of the boundaries are discontinuous in the corresponding 3D representation of the spherical video in accordance with the projection format. The 2D faces comprise the first 2D face and the second 2D face adjoining each other in one of the discontinuous boundaries. The first 2D face comprises the coding block, and the coding block adjoins the second 2D face. The 2D faces further comprises a third 2D face adjoining the first 2D face in a boundary that is continuous in the corresponding 3D representation of the spherical video in accordance with the projection format. The method further comprises performing the loop-filtering of the reconstructed sample values of the coding block based on the sample values of the set of filter support samples, wherein the set of filter support samples comprises one or more samples that are part of the third 2D face, operations 703, 704 707.

The method 700 may be performed by the apparatus 100 or the apparatus 200, e.g., by a reconstruction unit 114 and a loop-filter 120 included in the apparatus 100 or the apparatus 200. Further features of the method 700 directly result from the functionalities of the apparatus 100 and 200. The method 700 can be performed by a computer program.

The method 700 can be integrated into the apparatus 100 or the apparatus 200 without changes to the other building blocks. Only the loop-filtering unit 120 needs to be adapted. The method 700 can be applied separately to each implemented loop-filtering operation. It is possible to exploit the fact that a sample may or may not be on the list for two or more loop-filters as a control criterion for the configuration of a loop-filter.

Figure 8:
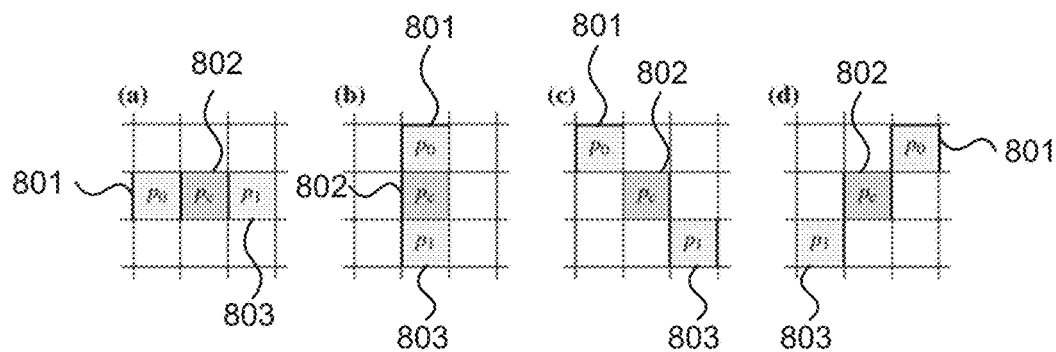
FIG. 8 illustrates examples of various boundary directions for a sample-adaptive offset filter in picture coding with selective loop-filtering.

Diagram 800 of FIG. 8 illustrates examples of various boundary or edge directions for a sample-adaptive offset filter in picture coding with selective loop-filtering. This example assumes the application of SAO in accordance with HEVC. Here, only the boundary offset mode need to be modified. The band offset mode works without a dependency on the neighborhood.

For boundary offset mode, step 1 and 2 of the algorithm A1 are applied. For step 3 of A1, different cases (a-d, in FIG. 8) have to be considered. The SAO behavior is modified if the $p_c$ is located at a border in the coding block (these are the samples collected in the above list of face boundary samples). $p_c$ can be:

a) below the top border of the coding block. Then, $p_0$ is taken from the geometrical neighboring face for the cases b, c and d.
b) right to the left border of the coding block. Then, $p_0$ is taken from the geometrical neighboring face for the cases a and c, and $p_1$ is taken from the geometrical neighboring face for the case d.
c) left to right border of the coding block. Then, $p_0$ is taken from the geometrical neighboring face for the case d, and $p_1$ is taken from the geometrical neighboring face for the cases a and c.
d) above the bottom border of the coding block. Then, $p_1$ is taken from the geometrical neighboring face for the cases b, c and d.

If $p_c$ is in a corner of a face, the diagonal neighbors are not available. This corresponds to the case that $p_c$ is in a corner of the frame for the original SAO filter. The remainder of the SAO filter does not need to be modified.

FIG. 6B illustrates an arrangement 650 for cube projection for a two-dimensional, 2D, representation of spherical video is provided. The 2D representation comprises a set of 2D cube faces interconnected via boundaries. One or more of the boundaries are discontinuous in a corresponding three-dimensional, 3D, representation of the spherical video. Only one boundary of each 2D cube face or its opposing boundary in the 3D representation is aligned with a boundary for which loop-filtering is to be performed by a picture coding apparatus in accordance with the first aspect.

For a correct filtering operation exactly one of each face boundary x or its pair x' (FIG. 6B) are aligned with the boundary processed by the DBF. The deblocking in JEM is implemented to operate on the top or left borders of a given block. In the disclosed concepts only the top of left borders of cube face boundaries are considered. The right and bottom borders are filtered automatically when their counterparts are processed. To this end, the DBF is modified to also allow filtering of the top and left picture borders. This is done because 360-degree video features rotational symmetry. When moving out of the picture at a border, one will reach another part of the image, instead of moving out of the scene.

In the arrangement 650, every boundary x or its pair x' is exactly once aligned with the top or left borders of coding blocks. Consequently, all cube face boundaries are filtered once. The face boundaries which are aligned with coding block boundaries considered by the DBF are: 2, 11', 8', 4, 10', 12, 3', 1', 5, 6', 7' and 9. Blocks belonging to their paired boundaries are processed at the same time as the blocks belonging to these boundaries.

The image coding apparatus and the corresponding method have been described in conjunction with various embodiments herein. However, other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality.

An embodiment of the present disclosure comprises or is a computer program comprising program code for performing any of the methods described herein, when executed on a computer.

An embodiment of the present disclosure comprises or is a computer readable medium comprising a program code that, when executed by a processor, causes a computer system to perform any of the methods described herein.

The person skilled in the art will understand that the "blocks" ("units") of the various figures represent or describe functionalities of embodiments of the invention (rather than necessarily individual "units" in hardware or software) and thus describe equally functions or features of apparatus embodiments as well as method embodiments (unit equaling step).

As explained above, the arrangements for image coding may be implemented in hardware, such as the video encoding apparatus or video decoding apparatus as described above, or as a method. The method may be implemented as a computer program. The computer program is then executed in a computing device.

The apparatus, such as video decoding apparatus, video encoding apparatus or any other corresponding image coding apparatus is configured to perform one of the methods described above. The apparatus may therefore include any necessary hardware components. These may include at least one processor, at least one memory, at least one network connection, a bus and similar. Instead of dedicated hardware components it is possible to share, for example, memories or processors with other components or access at a cloud service, centralized computing unit or other resource that can be used over a network connection.

Depending on certain implementation requirements of the described methods, the methods can be implemented in hardware or in software or in any combination thereof.

The implementations can be performed using a digital storage medium, in particular a floppy disc, CD, DVD or Blu-Ray disc, a ROM, a PROM, an EPROM, an EEPROM or a Flash memory having electronically readable control signals stored thereon which cooperate or are capable of cooperating with a programmable computer system such that an embodiment of at least one of the inventive methods is performed.

A further embodiment of the present disclosure is or comprises, therefore, a computer program product with a program code stored on a machine-readable carrier, the program code being operative for performing at least one of the inventive methods when the computer program product runs on a computer.

Embodiments of the described methods are or comprise, therefore, a computer program having a program code for performing at least one of the methods when the computer program runs on a computer, on a processor or the like.

A further embodiment of the present disclosure is or comprises, therefore, a machine-readable digital storage medium, comprising, stored thereon, the computer program operative for performing at least one of the inventive methods when the computer program product runs on a computer, on a processor or the like.

A further embodiment of the present disclosure is or comprises, therefore, a data stream or a sequence of signals representing the computer program operative for performing at least one of the inventive methods when the computer program product runs on a computer, on a processor or the like.

A further embodiment of the present disclosure is or comprises, therefore, a computer, processor or any other programmable logic device adapted to perform at least one of the inventive methods.

A further embodiment of the present disclosure is or comprises, therefore, a computer, processor or any other programmable logic device having stored thereon the computer program operative for performing at least one of the inventive methods when the computer program product runs on the computer, processor or the any other programmable logic device, e.g., a FPGA (Field Programmable Gate Array) or an ASIC (Application Specific Integrated Circuit).

While the foregoing was particularly shown and described with reference to particular embodiments thereof, it is to be understood by those skilled in the art that various other changes in the form and details may be made, without departing from the spirit and scope thereof. It is therefore to be understood that various changes may be made in adapting to different embodiments without departing from the broader concept disclosed herein and comprehended by the claims that follow.

What is claimed is:

1. A picture coding apparatus comprising one or more processors, the picture coding apparatus being configured to:
reconstruct sample values of a coding block of a picture of a two-dimensional ("2D") representation of spherical video in accordance with a projection format, the 2D representation comprising a set of 2D faces interconnected via boundaries, one or more of the boundaries being discontinuous in a corresponding three-dimensional ("3D") representation of the spherical video in accordance with the projection format, the 2D faces comprising a first 2D face and a second 2D face adjoining each other in one of the discontinuous boundaries, the first 2D face comprising the coding block, the coding block adjoining the second 2D face, and the 2D faces further comprising a third 2D face adjoining the first 2D face in a boundary, of the boundaries, that is continuous in the corresponding 3D representation of the spherical video in accordance with the projection format; and
perform loop-filtering of the reconstructed sample values of the coding block based on sample values of a set of filter support samples, wherein the set of filter support samples comprises one or more samples that are part of the third 2D face;
wherein the projection format comprises a cube format, wherein an arrangement for cube projection for a 2D representation of the spherical video, the 2D representation comprises a set of 2D cube faces interconnected via boundaries, one or more of the boundaries being discontinuous in a corresponding 3D representation of the spherical video, wherein only one boundary of each 2D cube face or its opposing boundary in the 3D representation is aligned with the boundaries of the coding block for which loop-filtering is to be performed; and wherein the loop-filtering is performed only on a top boundary and a left boundary of each 2D cube face.

2. The picture coding apparatus according to claim 1, further configured to defer the performing of the loop-filtering for one or more of the reconstructed sample values of the coding block in response to determining that one or more sample values of the samples in the set of filter support samples is not yet applicable for the loop-filtering, the deferral being until the one or more sample values of the samples in the set of filter support samples become applicable for the loop-filtering.

3. The picture coding apparatus according to claim 1, further configured to perform loop-filtering of one or more of the reconstructed sample values that are located at an outer picture boundary of the 2D representation.

4. The picture coding apparatus according to claim 1, further configured to maintain discontinuous boundary sample information indicating which of the reconstructed sample values are located at the one or more discontinuous boundaries.

5. The picture coding apparatus according to claim 4, further configured to maintain reconstruction state information indicating whether neighboring ones of the reconstructed samples values for the loop-filtering of the reconstructed sample values indicated by the discontinuous boundary sample information have been reconstructed.

6. The picture coding apparatus according to claim 5, wherein the loop-filtering comprises one or more different loop-filtering operations, and the picture coding apparatus is further configured to maintain at least one of the discontinuous boundary sample information or the reconstruction state information separately for each of the multiple different loop-filtering operations.

7. The picture coding apparatus according to claim 5, wherein the loop-filtering comprises one or more different loop-filtering operations, and the picture coding apparatus is further configured to maintain at least one of the discontinuous boundary sample information or the reconstruction state information jointly for each of the multiple different loop-filtering operations.

8. The picture coding apparatus according to claim 1, wherein the loop-filtering comprises at least one of an in-loop-bilateral filtering operation, a deblocking filtering operation, a sample adaptive offset filtering operation, or an adaptive loop-filtering operation.

9. The picture coding apparatus according to claim 1, wherein one or more parameters of the loop-filtering of the reconstructed sample values of the coding block differ from corresponding parameters of loop-filtering of reconstructed sample values of one or more other blocks in the picture.

10. The picture coding apparatus according to claim 1, wherein the picture coding apparatus comprises a picture encoder.

11. The picture coding apparatus according to claim 1, wherein the picture coding apparatus comprises a picture decoder.

12. A method of picture coding, the method comprising:
reconstructing sample values of a coding block of a picture of a two-dimensional ("2D") representation of spherical video in accordance with a projection format, the 2D representation comprising a set of 2D faces interconnected via boundaries, one or more of the boundaries being discontinuous in a corresponding three-dimensional ("3D") representation of the spherical video in accordance with the projection format, the 2D faces comprising a first 2D face and a second 2D face adjoining each other in one of the discontinuous boundaries, the first 2D face comprising the coding block, the coding block adjoining the second 2D face, and the 2D faces further comprising a third 2D face adjoining the first 2D face in a boundary, of the boundaries, that is continuous in the corresponding 3D representation of the spherical video in accordance with the projection format; and
performing loop-filtering of the reconstructed sample values of the coding block based on sample values of a set of filter support samples, wherein the set of filter support samples comprises one or more samples that are part of the third 2D face;
wherein the projection format comprises a cube format, wherein an arrangement for cube projection for a 2D representation of the spherical video, the 2D representation comprises a set of 2D cube faces interconnected via boundaries, one or more of the boundaries being discontinuous in a corresponding 3D representation of the spherical video, wherein only one boundary of each 2D cube face or its opposing boundary in the 3D representation is aligned with the boundaries of the coding block for which loop-filtering is to be performed; and wherein the loop-filtering is performed only on a top boundary and a left boundary of each 2D cube face.

13. A non-transitory computer readable storage medium comprising program code, which is configured such that when executed by a computing device, the program code causes the computing device to perform the method according to claim 12.

14. The picture coding apparatus of claim 1, the picture coding apparatus being further configured to deactivate loop-filtering of the reconstructed sample values of the coding block based on sample values of a set of filter support samples, wherein the set of filer support samples comprises one or more samples that are part of the second 2D face.

* * * * *